(12) United States Patent
Abbas et al.

(10) Patent No.: US 7,709,034 B2
(45) Date of Patent: May 4, 2010

(54) SOLUBLE NON-CALORIC FIBER COMPOSITION AND PROCESS OF PREPARING THE SAME

(75) Inventors: Charles Abbas, Champaign, IL (US); Kyle E. Beery, Decatur, IL (US); Thomas P. Binder, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 885 days.

(21) Appl. No.: 11/406,554

(22) Filed: Apr. 19, 2006

(65) Prior Publication Data

US 2006/0233914 A1    Oct. 19, 2006

Related U.S. Application Data

(60) Provisional application No. 60/672,794, filed on Apr. 19, 2005.

(51) Int. Cl.
*A23K 1/00* (2006.01)
*A23L 1/164* (2006.01)
*C08B 3/16* (2006.01)

(52) U.S. Cl. .................. 426/49; 424/439; 435/101; 536/64; 536/65

(58) Field of Classification Search .................. None
See application file for complete search history.

(56) References Cited

U.S. PATENT DOCUMENTS

| | | | |
|---|---|---|---|
| 4,038,481 A | 7/1977 | Antrim et al. | |
| 4,104,463 A | 8/1978 | Antrim et al. | |
| 4,806,475 A | 2/1989 | Gould | |
| 4,927,654 A | 5/1990 | Barnett et al. | |
| 4,957,599 A | 9/1990 | Chou et al. | |
| 5,139,575 A | 8/1992 | Matsuda et al. | |
| 5,264,568 A | 11/1993 | Yamada et al. | |
| 5,358,729 A | 10/1994 | Ohkuma et al. | |
| 5,364,652 A | 11/1994 | Ohkuma et al. | |
| 5,430,141 A | 7/1995 | Ohkuma et al. | |
| 5,472,732 A | 12/1995 | Ohkuma et al. | |
| 5,620,873 A | 4/1997 | Ohkuma et al. | |
| 6,147,206 A | 11/2000 | Doner et al. | |
| 6,388,069 B1 | 5/2002 | Buchanan et al. | |
| 6,586,212 B1 * | 7/2003 | Buchanan et al. | 435/101 |
| 6,589,760 B1 * | 7/2003 | Buchanan et al. | 435/23 |
| 2003/0207407 A1 | 11/2003 | Buchanan et al. | |
| 2006/0029702 A1 * | 2/2006 | McPherson et al. | 426/481 |

FOREIGN PATENT DOCUMENTS

EP    00308716    4/2001

OTHER PUBLICATIONS

Wolf, M.J. et al., Preparation and Some Properties of Hemicelluloses from Corn Hulls, Cereal Chemistry, vol. 30, pp. 451-470, Nov. 1953.
Doner, Landis W. et al., An Improved Process for Isolation of Corn Fiber Gum, Cereal Chemistry, vol. 75, No. 4, pp. 408-411, Mar. 3, 1998.
Hespell, Robert B., Extraction and Characterization of Hemicellulose from the Corn Fiber Produced by Corn Wet-Milling Processes, J. Agric. Food Chem., pp. 2615-2619, 1998.

* cited by examiner

*Primary Examiner*—Herbert J. Lilling
(74) *Attorney, Agent, or Firm*—Craig G. Cochenour; Duane A. Stewart, III; Buchanan Ingersoll & Rooney PC

(57) ABSTRACT

A process for extracting the water soluble fiber from corn fiber hulls is provided comprising the steps of subjecting the corn fiber hulls to a destarching process, a dewatering process, and exposing the destarched and dewatered corn fiber hulls to a thermochemical treatment to obtain a water-soluble non-caloric corn fiber. A water-soluble non-caloric corn fiber composition is disclosed comprising a destarched corn fiber hull produced by subjecting corn fiber hulls to a non-alkaline destarching process to obtain a destarched corn fiber, dewatering said destarched corn fiber hull, and exposing said destarched and dewatered corn fiber hull to one or more thermochemical treatments to obtain a water-soluble non-caloric corn fiber. Foods and a pharmaceutical comprising the water-soluble non-caloric corn fiber composition are disclosed.

15 Claims, No Drawings

SOLUBLE NON-CALORIC FIBER COMPOSITION AND PROCESS OF PREPARING THE SAME

CROSS-REFERENCE TO RELATED APPLICATION

This application is a nonprovisional of and claims the benefit of priority to U.S. Provisional Patent Application Ser. No. 60/672,794, filed on Apr. 19, 2005, entitled "Soluble Low Calorie Fiber Composition and Process of Preparing the Same", having the same named applicants as inventors, namely, Charles Abbas, Kyle E. Beery, and Thomas P. Binder. The entire contents of U.S. Provisional Patent Application Ser. No. 60/672,794 is incorporated by reference into this nonprovisional utility patent application.

BACKGROUND OF THE INVENTION

1. Field of the Invention

This application relates to the commercial processing of corn fiber hulls, and, in particular, to the production of a water soluble corn fiber composition. The water soluble corn fiber composition may be used in food applications as a non-caloric additive or filler or may be used for non-food uses.

2. Description of the Background Art

The water soluble fiber extract from the hulls of corn kernels can serve as a non-caloric additive for food and non-food uses. Methods of extracting the hemicellulosic portion of the corn fiber are well known in the prior art. In particular, well known prior art methods utilize a multi-step process starting with an alkaline extraction of the corn fiber hemicellulose gum fraction as a whole. The processing of the corn fiber by alkaline extraction utilizes hydrogen peroxide, alkali, protease enzyme, and/or solvents to extract the hemicellulose gum. These methods are expensive because of the multiple steps and materials needed. Therefore, it is desirable to develop an economical process utilizing fewer steps and materials.

U.S. Pat. No. 4,038,481 discloses a method of treating corn hulls with alkali to hydrolyze the corn hulls to effect liberation of the hemicellulose fraction.

U.S. Pat. No. 4,957,599 discloses a process for converting nonwoody lignocellulosic substrates into products digestible by ruminants and ingestible by humans by forming a slurry of the substrate with an aqueous alkali for wetting of the substrate and subsequently forming a slurry of the wetted substrate in an alkaline peroxide solution to expose the hemicellulose.

U.S. Pat. No. 5,264,568 discloses a process for preparing a pyrodextrin comprising heating starch in the presence of hydrochloric acid, dissolving the pyrodextrin in water, adjusting the aqueous solution of the pyrodextrin to a pH of from 7.0 to 8.5, pre-hydrolyzing the pH adjusted solution with alpha-amylase produced by *Bacillus licheniformis* to obtain a hydrolysate, adjusting the hydrolysate to a pH of from 5.5 to 6.5, hydrolyzing the pH adjusted hydrolysate with alpha-amylase, adjusting the hydrolysate to a pH of 4.0 to 5.0, autoclaving the resulting hydrolysate, hydrolyzing the autoclaved hydrolysate with the alpha-amylase, adjusting the hydrolysate to a pH of 4 to 5, and autoclaving the resulting hydrolysate.

U.S. Pat. No. 5,430,141 discloses a process of preparing low calorie dextrin comprising the steps of heating corn starch in the presence of mineral acid to prepare pyrodextrin, hydrolyzing the pyrodextrin with alpha-amylase, adding an organic solvent such as ethanol to the hydrolyzed pyrodextrin and recovering low calorie pyrodextrin from the solvent.

U.S. Pat. No. 6,147,206 discloses a process for the preparation of corn fiber gum comprising mixing corn fiber with an alkaline solution to form a slurry and extract hemicellulose, treating the slurry with hydrogen peroxide at a pH of 10 to 12.5, and separating out the insoluble fractions from the corn fiber slurry to yield corn fiber gum in solution.

In spite of this background art, there remains a very real and substantial need for an economical process for extracting the water-soluble portion of corn fiber hulls to yield a water-soluble non-caloric corn fiber that is useful as an additive to animal feed, ingestible for human food consumption, and for non-food uses such as an ingredient or filler in a pharmaceutical composition.

SUMMARY

Disclosed herein are cost effective methods for extraction of corn fiber from corn hulls as a mixture of water soluble material of varying molecular weight polymers comprising oligosaccharides/polysaccharides and proteins. The water soluble portion of the corn fiber hulls is extracted with a thermochemical treatment after destarching of the corn fiber hulls using a process that employs a non-alkaline and enzymatic treatment of the corn fiber hulls with starch releasing and degrading enzymes. The thermochemical treatment employs a hot water hydrolysis step to obtain a soluble fiber extract from the treated corn fiber hulls. The hot water solubilized fiber extract prepared with or without acid treatment is optionally processed further by any of several purification steps, including for example, but not by way of limitation: carbon treatment, ion exchange chromatography, filtration, or centrifugation to remove impurities such as, for example, colored components, precipitates formed after extractions or other high molecular weight material or salts formed in the extracts post extraction and/or concentration. Fractionation of this soluble fiber extract can optionally be further conducted to recover different molecular weight preparations that have various food and non-food uses.

A water-soluble non-caloric corn fiber composition is also disclosed comprising a destarched corn fiber hull produced by subjecting corn fiber hulls to a non-alkaline destarching process (acidic or non-alkaline enzyme solution) to obtain a destarched corn fiber, dewatering the destarched corn fiber hull, and exposing the destarched and dewatered corn fiber hull to one or more thermochemical treatments to obtain a water-soluble non-caloric corn fiber. In another embodiment of this invention, the composition disclosed herein is a water-soluble oligosaccharide fiber concentrate in solution form. In yet another embodiment, the composition is in a dried form.

Another embodiment provides a food comprising a foodstuff and a water-soluble non-caloric corn fiber composition prepared from a destarched corn fiber hull produced by subjecting corn fiber hulls to a non-alkaline destarching process to obtain a destarched corn fiber, dewatering the destarched corn fiber hull, and exposing the destarched and dewatered corn fiber hull to one or more thermochemical treatments to obtain a water-soluble non-caloric corn fiber composition. The foodstuff may be any known conventional animal or human consumable food ingredient(s). The food may be an animal feed, or a food suitable for human consumption.

In another embodiment, a pharmaceutical composition is provided comprising a drug and a water-soluble non-caloric corn fiber composition comprising a destarched corn fiber hull produced by subjecting corn fiber hulls to a non-alkaline destarching process to obtain a destarched corn fiber, dewatering the destarched corn fiber hull, and exposing the destarched and dewatered corn fiber hull to one or more thermochemical treatments to obtain a water-soluble non-caloric corn fiber composition.

DETAILED DESCRIPTION

The process disclosed herein comprises destarching corn fiber hulls and employing a thermochemical hydrolysis step for solubilizing the destarched corn fiber to create a composition (preferably a food-grade product) that comprises a hemicellulose-derived fiber that is non-caloric (i.e., indigestible by humans) and that is useful as a food additive, pharmaceutical filler for human or animal consumption. As used herein, "corn fiber hull" is the pericarp material remaining after removing the germ and endosperm from corn grain, typically, but not exclusively, by a wet milling process. The starting corn fiber hull material comprises about 17-25% starch, about 9-13% protein, about 40-45% hemicellulose, about 14-18% cellulose, about 2-3% ash, about 3-4% oil, and about 3-6% ferulic acid and coumaric acid. The arabinoxylan-containing hemicellulose contains 80-90% of the polymer molecular weight as D-xylose and L-arabinose, with the xylan backbone substituted with side chains comprising one or more of L-arabinose and D-mannose, D-galactose, ferulic acid, coumaric acid, and D-glucuronic acid accounting for the remaining 10-20% of the polymer molecular weight.

As used herein throughout, the term "about" with reference to a single value means the stated value±10% of the value or ±the degree of accuracy of the measuring instrument, whichever is greater. With reference to a range, "about" means the stated range±20% of the difference between the upper and lower limits of the range or the degree of accuracy of the measuring instrument, whichever is greater.

In the presently disclosed process, the corn fiber hulls are first enzymatically destarched to prevent the generation of degradation products from the breakdown of glucose, which is derived mainly from the hydrolysis of starch, during the thermochemical step. The destarching step comprises placing the as-is corn fiber hulls obtained from a wet milling plant (typically having a moisture content ranging from about 45% to about a 70% by weight water, and more typically from about a 53% to about a 65% by weight water) in a sufficient amount of water to obtain a mixture that has about a 10-15% by weight corn fiber hull solids content. If the corn fiber hulls are obtained from a dry milling plant the moisture content can be adjusted to obtain the same levels for the mixture. The mixture is treated to a temperature ranging from about 35° C. to about 70° C., and more typically at about 50° C., in a standard jacketed half-moon tank at ambient pressure, and the mixture is adjusted to a non-alkaline pH ranging from about 3 to about 5 with an inorganic acid (mineral acid). In certain embodiments, it is particularly advantageous to use sulfuric acid as the inorganic acid. To the mixture is added from about 0.01 to about 1.0%, and typically about 0.05% (total weight enzyme/weight dry corn fiber) of a starch degrading enzyme. In certain embodiments, the starch degrading enzyme is a mixture that comprises equal parts of α-amylase and another starch degrading enzyme such as glucoamylase. The mixture with enzyme is held at a temperature and for a time sufficient to hydrolyze at least a majority of the starch in the corn fiber hulls. In exemplary practice, the temperatures is about 50° C. to about 90° C., and typically about 60° C., and the time is from about 0.1 hour to about 24 hours, and typically about 16 hours. The mixture is churned, for example by agitating with a blade agitator at an RPM ranging from about 100 to about 800 RPM, typically about 150 RPM. The agitation speed is not important so long as the mixture can be fully intermixed. A tumbler is a suitable alternative to an agitator for large scale embodiments.

The hydrolysis of the starch yields a mixture containing a soluble component comprising primarily glucose and an insoluble component containing a crude fiber mixture comprised primarily of cellulose and hemicelluloses. The crude insoluble fiber from the destarching step is dewatered (i.e., liquid is removed therefrom) using a suitable solid/liquid separation technique. Suitable non limiting examples include filtration, precipitation, centrifugation and use of screw press. One exemplary embodiment utilizes a Vincent press set at from about 10 to about 60 Hz, and more preferably at about 20 Hz (Vincent Corporation, Tampa, Fla.), washed utilizing an equivalent weight of water as the corn fiber employing from about 1-3 equivalent weights. The crude fiber fraction is dewatered again utilizing the Vincent press to further remove the solubilized liquid fraction. When not using a screw press, the crude fiber fraction may be washed by spraying and centrifugation, spraying and filtration, by resuspension and filtration or any other means available to one of skill in the art to wash a fiber fraction with a solvent (e.g., water) in which the fiber is insoluble.

The washed crude fiber fraction is then subjected to a thermochemical hydrolysis step where the crude fiber is treated to elevated temperatures in the presence of water and optionally with added acid. Even if no additional acid is added, the treatment is still thermochemical because a (i) a portion of the acid from the destarching step is carried over with the crude fiber, (ii) a portion of free acids, such as lactic acid present in the original corn fiber hull material remains with the crude fiber, and (iii) the breakdown products from treating the crude fiber fraction to heat in the presence of water includes acetic acid released from the hemicellulose present in the crude fiber fraction. In an exemplary embodiment, the thermochemical heating is conducted utilizing a pressure reactor having a rotating pressure tank at a temperature from about 130° C. to about 175° C., typically at about 145° C. and at a pressure of from about 2.70 bar to about 8.92 bar, and typically at about 5.1 bar for about 1 to 60 minutes, typically about 30 minutes. In an exemplary practice the tank is rotated, at from about 0.1 to 10 RPM and in one practice, at about 1 RPM.

This thermochemical treatment step hydrolyzes a portion of the hemicellulose into a soluble fraction comprising monosaccharides (primarily xylose) and small soluble oligosaccharides that are indigestible by humans (i.e., water soluble non-caloric fiber). The other fraction remains an insoluble crude fiber fraction containing cellulose, along with the unhydrolyzed portion of the hemicellulose. Optionally, the insoluble crude fiber fraction may be further dewatered and subjected to a second thermochemical treatment to obtain more soluble fiber. In one exemplary practice, the fiber from the first thermochemically treated mixture is first dewatered utilizing a Vincent press set at from about 10 to about 60 Hz, atypically at about 20 Hz (Vincent Corporation, Tampa, Fla.) to obtain the liquid fraction containing the soluble fiber, and the insoluble fiber residue is washed utilizing from about 1 to 3 equivalent weight of water and dewatered again utilizing the Vincent press to further extract any solubilized fiber prior to being treated to a second thermochemical heating step.

In certain embodiments, a single thermochemical treatment step hydrolyzes at least about 30% (typically about 30-50%) of the hemicellulose into water soluble fiber. In other embodiments to increase yield, the soluble fraction may be removed from the crude fiber and the crude fiber may be subjected to a second thermochemical treatment to further obtain a second soluble fraction containing the water soluble non-caloric fiber. In any case, the overall hydrolysis is similar to the thermochemical hydrolysis of the non-destarched corn fiber hulls; however, the amount of Maillard reaction byproducts is much low, leading to a lighter colored product.

The water soluble fraction containing the monosaccharides and water soluble fiber prepared by the methods herein may be characterized in several ways. In one characterization, the solid content of the water soluble fraction comprises at least about 10% of oligosaccharides having a degree of polymerization greater than 2. In another characterization, the water soluble fraction comprises at least about 20% of oligosaccharides having a degree of polymerization greater than 2. In yet another characterization, the water soluble fraction comprises at leas about 30% of oligosaccharides having a degree of polymerization greater than 2. In still another characterization, the ratio of water soluble oligosaccharides having a degree of polymerization between 2 and 9 to monosaccharides is at least about 10%, at least about 20%, at least about 30% and in some embodiments, at least about 40%. In yet another characterization, the ratio of water soluble oligosaccharides having a degree of polymerization between 8 and 9 to water soluble oligosaccharides having a degree of polymerization between 2 and 7 is at least 0.8 and in certain embodiments, between about 0.8 and about 3.0. In still yet another characterization, the composition may be characterized by any of the foregoing ratios of carbohydrate material and further contains a protein component derived from hemicellulose. The liquid fraction containing the soluble fiber is separated from the insoluble crude fiber fraction by any suitable solid/liquid separation step and the liquid fraction is retained. The liquid fraction may be concentrated to provide a concentrated soluble fiber product or dried to provide a solid soluble fiber product.

The liquid fraction can be optionally processed by any of a number of methods known by those skilled in the art to remove impurities or other components, for example when the soluble fiber is to be used as food additive or particularly when the fiber is used a pharmaceutical or pharmaceutical additive. In certain embodiments the liquid fraction may be treated to sizing techniques such as chromatography or precipitation to select fractions containing various distributions of size ranges of the soluble fiber, or specifically to remove monosaccharides and disaccharides from the liquid fraction. Suitable methods that may be employed, include but are not limited to: ion exchange chromatography (for example, strong acid or strong base cation exchange chromatography typically conducted at a ambient temperatures, with a flow rates of from about 1-20 bed volumes per hour; a carbon column treatment at under ambient conditions with similar flow rates; membrane ultrafiltration utilizing a 100K molecular weight cut off membrane filtration unit at pressures ranging from about 25 to 150 psi pounds per square inch; filtration using a filter aid with diatomaceous earth and a suitable vacuum—(e.g., 30 in Hg (−762 torr; and centrifugation, for example, utilizing a disk-stack type centrifuge.

An optional treatment on the soluble fiber-containing liquid could be a fermentation step for the purpose of removing any fermentable sugars from the mixture. This would ensure the removal of any glucose, xylose or other monosaccharides or maltose and other digestible disaccharides, which are both digestible by humans from the final product. This could take place at a temperature range from about 28° C. to about 35° C., and preferably at 30° C. with *Saccharomyces cerevisiae* in a fermentor at a pH ranging from about 3.5 to about 5.5 and preferably at pH 4.5 with agitation at 100 RPM at ambient pressure. As mentioned, the liquid containing the soluble fiber can be further processed to create a water soluble fiber-concentrate or a dry fiber product. One example method of drying the fiber composition is to spray-dry the liquid utilizing an APV Crepaco, Inc spray dryer with an inlet temperature ranging from about 200° C. to about 300° C. and preferably at about 260° C. and an outlet temperature ranging from about 50° C. to about 150° C. and preferably at about 86° C. The dry product or concentrate can be used as a non-caloric filler in human food applications, or for various uses in non-food applications such as a pharmaceutical additive.

EXAMPLES

The following examples demonstrate the instant invention in greater detail. These examples are not intended in any way to limit the scope of this invention in any way.

Example I 50 mL each of four starch degrading enzymes obtained from commercial sources Genencor International and Novozymes; two α-amylase enzymes (EC 3.2.1.1. Spezyme FRED and Termamyl SC) and two amyloglucosidase enzymes (EC 2.2.1.3, Spirizyme Plus and Optidex L-400) were added to 20.7 kg (41.26% solids; 8.55 kg dry weight basis (d.w.b.)) of corn fiber. A total of 44.2 kg of deionized water were added to the corn fiber slurry to lower the solids content to 13% dry solids. The slurry was held at about 60° C. in the tumbler reactor, which was rotating at about 1 RPM, for about 20 hrs. After the starch hydrolysis, the corn fiber was mechanically dewatered to 42.3% solids by processing with a screw press. After the starch hydrolysis, 15.6 kg (6.62 kg d.w.b.) of fiber remained, therefore 22.6% of the fiber had been solubilized by the starch hydrolysis step. The remaining fiber was split into two 7.82 kg (3.31 kg d.w.b.) batches of destarched corn fiber for subsequent thermochemical hydrolysis. The first 7.82 kg batch of destarched corn fiber was hydrolyzed as is without addition of acid, and the second batch was hydrolyzed with the addition of acid.

Example II

The first batch of destarched fiber was mixed with 11.3 kg of deionized water to lower the solids concentration to 17.3%. The fiber was hydrolyzed in the tumbler reactor at about 141° C. and about 1 RPM for about 30 minutes at a pressure of about 5.1 bar. The amount of time it took to reach the hydrolysis temperature was approximately 20 minutes and the depressurization step was completed in approximately 15 minutes to reach ambient pressure. 0.22 kg of steam condensate was added to the corn fiber during the thermochemical hydrolysis step. After the thermochemical hydrolysis, the fiber was mechanically dewatered in a screw press, resulting in 10.7 kg of extract with a pH of 3.45. The fiber was washed with water and mechanically dewatered again to 42.3% solids, resulting in 13.9 kg of wash extract with a pH of 3.40. The mass of the remaining fiber was 4.99 kg (2.11 kg d.w.b.), therefore 36.2% of the fiber had been solubilized by the thermochemical treatment, and 50.7% overall (destarching and thermochemical hydrolysis).

Example III

The second batch of fiber (7.82 kg) was treated with 0.3% sulfuric acid (23.5 g). The sulfuric acid was mixed into a total of 12.7 kg of water, and the liquid was added to the fiber to decrease the solids content to 16.1%. The fiber was hydrolyzed in the tumbler reactor at about 141° C. and about 1 RPM for about 30 minutes and at a pressure of 5.1 bar. The amount of time it took to reach the hydrolysis temperature was approximately 20 minutes and the depressurization step was completed in approximately 15 minutes to reach ambient pressure. 0.73 kg of steam condensate was added to the corn fiber during the thermochemical hydrolysis step. After the thermochemical hydrolysis step, the fiber was mechanically dewatered in a screw press, resulting in 13.5 kg of extract with a pH of 2.50. The fiber was washed with water and mechanically dewatered again to 39.93% solids, resulting in 12.8 kg of extract with a pH of 2.80. The mass of the remaining fiber was 4.42 kg (1.77 kg d.w.b.), therefore 46.6% of the fiber had been solubilized by the thermochemical treatment, and 58.7% overall (destarching and thermochemical hydrolysis).

The corn fiber hydrolysate extracts of Examples I and II prepared from the soluble corn fiber preparation obtained without acid addition or after acid addition, respectively, were filtered through a VWR 417 (fast, qualitative) 11.0-cm paper filter in a Buchner funnel attached to a vacuum filter flask. A pre-coat of filter aid diatomaceous earth was poured over the filter prior to introducing the hydrolysates.

The procedure for pouring the filter aid pre-coat was as follows:
 a. Place the filter in the Buchner funnel assembly;
 b. Mix the filter aid slurry in a breaker with deionized water (DI) water;
 c. Wet the filter with DI water while attached to the vacuum line; and
 d. Pour the filter aid slurry slowly at first, and then rapidly to form the pre-coat.

After the pre-coat was poured, the hydrolysate was filtered until the top layer of the pre-coat was blocked with solids. At this point, the top layer of the pre-coat was scraped off and the hydrolysate was filtered until the filter aid became blocked with solids again. The top layer was then scraped and the cycle was repeated until the pre-coat was removed. At this point, a new filter and filter aid pre-coat were applied and the process was repeated.

Protein and DP Analysis for the Soluble Corn Fiber Oligosaccharide Hydrolysates

Four samples for protein and DP (degree of polymerization) analysis were prepared for the corn fiber oligosaccharide hydrolysates as follows: (1) hydrolyzed (no acid) and unfiltered; (2) hydrolyzed (no acid) and filtered; (3) acid hydrolyzed and unfiltered; and (4) acid hydrolyzed and filtered.

Protein Analysis from Corn Fiber Hydrolysates

The protein concentration of the four hydrolysates (1-4 above) was analyzed by the Bradford assay (Bradford, M. M. "A rapid and sensitive method for the quantitation of microgram quantities of protein utilizing the principle of protein-dye binding", Anal Biochem. 1976 May 7; 72:248-54) as known by those skilled in the art.

Bradford Protein Assay

An estimate of the protein concentration for the samples was used for the four samples listed above. The acid-treated hydrolysates had a dry solids level of about 6.56% and the non-acid-treated hydrolysates had a dry solids level of about 5.3%. The protein levels were estimated to be about 5.9 g/L in the acid treated hydrolysates and about 2.6 g/L in the non-acid-treated hydrolysates. Therefore, the proper dilution factor is 1000× for each sample, so each sample was diluted 1000× to obtain protein concentrations between 2 and 10 ppm (parts per million). The instructions for the Bradford Assay as listed above were carried out and the absorbance of the standards and samples were determined. The concentrations and absorbencies as analyzed in the standards were used to plot the standard curve and to obtain the slope and intercept, which were used to calculate the protein concentrations in the experimental samples. Table 1 shows the calculated protein concentrations of the four experimental samples.

DP Analysis

The four experimental samples were analyzed for monosaccharides and oligosaccharides with up to a degree of polymerization (DP) of 9 by chromatography. The results are shown in Table 2.

Results

The protein analysis (Table 1) shows that the protein concentration is increased by the presence of acid in the hydrolysis procedure, but removed by the filtration step using filter aid as set forth herein.

Using acid in the hydrolysis step decreases the degree of polymerization (DP2 to DP9) of the oligosaccharides in the hydrolysates, this is most likely because the liberated oligosaccharides are immediately degraded to monosaccharides or degradation products. This reaction is catalyzed by the sulfuric acid present in the liquid.

The filtration step removed nearly all of the degree of polymerization (DP2 to DP9) of oligosaccharides and a large fraction of the monosaccharides, as well as the protein (as set forth herein).

The filtration media absorbs a large portion of the protein, oligosaccharides, and monosaccharides in the hydrolysates. The results show that preferably, the hydrolysates are to be used as-is without filtration. For the unfiltered hydrolysates, a large peak appears at the beginning of the chromatogram when the hydrolysate is analyzed, and this peak is likely composed of larger oligosaccharides, or highly branched oligosaccharides. More preferably, the results show that the unfiltered non-acid prepared hydrolysate is the fraction that is most important if the hydroysateis to be used as a food-grade fiber, non-caloric additive, or filler. Table 1: Calculated Protein Concentrations by Bradford Analysis.

TABLE 1

Protein analysis of soluble fiber from corn fiber hulls

| Samples | PPM (parts per million) | Absorbance | Protein Concentration in Sample (g/L) |
|---|---|---|---|
| 1. No Acid, unfiltered | 2.85 | 0.509 | 2.85 |
| 2. No Acid, filtered | 0.91 | 0.478 | 0.91 |
| 3. Acid, unfiltered | 4.85 | 0.541 | 4.85 |
| 4. Acid, filtered | 1.54 | 0.488 | 1.54 |

TABLE 2

DP Analysis by Chromatography (values in grams/liter)

| Sample Id | DP8-DP9 | DP2-DP7 | DP1 |
|---|---|---|---|
| 1. No acid, un-filtered | 2.70 | 0.90 | 8.90 |
| 2. No acid, filtered | 0 | 0.10 | 2.60 |

TABLE 2-continued

DP Analysis by Chromatography (values in grams/liter)

| Sample Id | DP8-DP9 | DP2-DP7 | DP1 |
|---|---|---|---|
| 3. Acid, un-filtered | 0.40 | 0.50 | 9.60 |
| 4. Acid, filtered | 0 | 0 | 6.20 |

Samples containing water soluble corn fiber were spray dried using an APV Crepaco, Inc. spray dryer. The inlet temperature was kept at approximately 260° C. and the outlet temperature was approximately 86° C. The extracts were pumped through the spray dryer nozzle and the material dried and agglomerated and pneumatically conveyed out of the dryer. In one example, from above the acid-treated water soluble corn fiber extract produced 350.8 g of material and the non-acid treated water soluble corn fiber extract produced 256.45 g of material.

The methods and processes illustratively described herein may be suitably practiced in differing orders of steps. They are not necessarily restricted to the orders of steps indicated herein or in the claims.

As used herein and in the appended claims, the singular forms "a," "an," and "the" include plural reference unless the context clearly dictates otherwise.

Under no circumstances may the patent be interpreted to be limited to the specific examples or aspects or methods specifically disclosed herein. Under no circumstances may the patent be interpreted to be limited by any statement made by any Examiner or any other official or employee of the Patent and Trademark Office unless such statement was specifically and without qualification or reservation expressly adopted by Applicants in a responsive writing specifically relating to the application that led to this patent prior to its issuance.

The terms and expressions employed herein have been used as terms of description and not of limitation, and there is no intention in the use of such terms and expressions, or any portions thereof, to exclude any equivalents now known or later developed, whether or not such equivalents are set forth or shown or described herein or whether or not such equivalents are viewed as predictable, but it is recognized that various modifications are within the scope of the invention claimed, whether or not those claims issued with or without alteration or amendment for any reason. Thus, it shall be understood that, although the present invention has been specifically disclosed by preferred embodiments and optional features, modifications and variations of the inventions embodied therein or herein disclosed can be resorted to by those skilled in the art, and such modifications and variations are considered to be within the scope of the inventions disclosed and claimed herein.

Specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. Where examples are given, the description shall not be construed to include but not to be limited to only those examples. It will be readily apparent to one skilled in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive. Thus, for example, additional embodiments are within the scope of the invention and within the following claims.

Whereas particular embodiments of this invention have been described for purposes of illustration, it will be evident to those persons skilled in the art that numerous variations of the details of the present invention may be made without departing from the invention as defined in the appended claims.

We claim:

1. A process for extracting the water-soluble portion of corn fiber hulls to obtain a water-soluble non-caloric corn fiber comprising the steps of:

subjecting said corn fiber hulls to a destarching process to obtain a destarched corn fiber, wherein said destarching process comprises treating a water and corn fiber mixture in the absence of an alkaline compound, at a temperature between about 35° C. and about 70° C. and at a pH from about 3 to about 5 in the presence of a starch-degrading enzyme mixture consisting of alpha-amylase and glucoamylase;

dewatering said destarched corn fiber; and exposing said dewatered and destarched corn fiber to a thermochemical treatment to obtain a liquid fraction containing water-soluble non-caloric corn fiber, wherein said thermochemical treatment comprises elevating the temperature of the corn fiber to between about 130° C. to about 175° C. at a pressure of between about 2.70 bar to about 8.92 bar, in the presence of water and, optionally, acid.

2. The process of claim 1 wherein said destarching process comprises forming a mixture of water and corn fiber hulls; adjusting the pH of said water-corn fiber hull mixture to a non-alkaline pH; and contacting the mixture with a starch degrading enzyme in an amount and for a time sufficient to hydrolyze a majority of starch in corn fiber hull.

3. The process of claim 2 wherein said thermochemical treatment comprises a hot water hydrolysis of said treated corn fiber at a temperature ranging from about 130° C. to about 175° C. for a time sufficient to hydrolyze at least about 30%—of the hemicellulose present in the destarched corn fiber.

4. The process of claim 3 comprising the steps of performing a first dewatering of said destarched corn fiber hulls utilizing a screw-type press;

washing said destarched corn fiber hulls with water and performing a second dewatering of said destarched corn fiber hulls utilizing a screw-type press.

5. The process of claim 1 wherein the thermochemical treatment includes addition of an inorganic acid.

6. The process of claim 5 wherein said inorganic acid is sulfuric acid.

7. The process of claim 1 wherein the thermochemical treatment does not include addition of an inorganic acid.

8. The process of claim 1 further comprising treating said liquid fraction to remove impurities that are not water soluble corn fiber.

9. The process of claim 8 wherein said step of treating said liquid fraction includes performing at least one process selected from the group consisting of ion exchange chromatography, carbon column treatment, membrane filtration, filtration using a filter aid and centrifugation.

10. A process for extracting the water-soluble portion of corn fiber hulls to obtain a water-soluble non-caloric corn fiber comprising the steps of:

subjecting said corn fiber hulls to a destarching process to obtain a destarched corn fiber, wherein said destarching process comprises treating a water and corn fiber mixture in the absence of an alkaline compound, at a temperature between about 35° C. and about 70° C. and at a pH from about 3 to about 5 in the presence of a starch-degrading enzyme mixture consisting of alpha-amylase and glucoamylase:

dewatering said destarched corn fiber; and exposing said dewatered and destarched corn fiber to a thermochemical treatment to obtain a liquid fraction containing water-soluble non-caloric corn fiber, wherein said thermochemical treatment comprises elevating the temperature of the corn fiber to between about 130° C. to about 175° C. at a pressure of between about 2.70 bar to about 8.92 bar, in the presence of water and, optionally, acid, wherein said liquid fraction is fermented with a micro organism that does not digest the water soluble corn fiber to remove fermentable sugars from said liquid fraction.

11. The process of claim 1 further comprising drying at least one of said liquid or a water soluble corn fiber obtained from said liquid fraction by processing with a spray dryer, drum dryer, or other drying equipment to create a dry water soluble corn fiber containing product.

12. The process of claim 1 wherein the destarching comprises contacting the corn fiber hulls with ea starch degrading enzyme in the form of a mixture of two or more starch degrading enzymes.

13. The process of claim 12 wherein said one or more starch degrading enzymes includes at least one of an α-amylase enzyme and at least one of an amyloglucosidase enzyme.

14. The process of claim 12 wherein said mixture of said starch degrading enzymes comprises equal parts of each of said starch degrading enzymes.

15. The process of claim 1 wherein the liquid fraction is characterized by having at least 20% of dissolved solids comprising a water soluble corn fiber having a DP of greater than 2, and with a measurable portion having a DP of 8-9.

* * * * *